United States Patent
Samoto et al.

(10) Patent No.: US 9,345,254 B2
(45) Date of Patent: May 24, 2016

(54) PROCESSED SOYBEAN MATERIAL AND METHOD FOR PRODUCING PROCESSED SOYBEAN MATERIAL

(75) Inventors: Masahiko Samoto, Tsukubamirai (JP); Takayasu Motoyama, Tsukubamirai (JP); Jiro Kanamori, Tsukubamirai (JP); Masashi Asanoma, Izumisano (JP)

(73) Assignee: FUJI OIL HOLDINGS INC., Osaka (JP)

( * ) Notice: Subject to any disclaimer, the term of this patent is extended or adjusted under 35 U.S.C. 154(b) by 209 days.

(21) Appl. No.: 13/820,016

(22) PCT Filed: Sep. 1, 2011

(86) PCT No.: PCT/JP2011/069909
§ 371 (c)(1),
(2), (4) Date: Apr. 5, 2013

(87) PCT Pub. No.: WO2012/029909
PCT Pub. Date: Mar. 8, 2012

(65) Prior Publication Data
US 2013/0183429 A1 Jul. 18, 2013

(30) Foreign Application Priority Data

Sep. 2, 2010 (JP) ................ P2010-196703
Nov. 5, 2010 (JP) ................ P2010-248733

(51) Int. Cl.
| | |
|---|---|
| A23L 1/211 | (2006.01) |
| A23L 1/20 | (2006.01) |
| A23L 1/305 | (2006.01) |
| A23L 1/314 | (2006.01) |
| A23L 1/317 | (2006.01) |
| A23L 2/52 | (2006.01) |
| A23L 2/56 | (2006.01) |
| A23L 2/66 | (2006.01) |
| A23C 11/06 | (2006.01) |
| A23C 11/10 | (2006.01) |
| A23G 9/32 | (2006.01) |

(52) U.S. Cl.
CPC .............. *A23L 1/2112* (2013.01); *A23C 11/06* (2013.01); *A23C 11/103* (2013.01); *A23G 9/32* (2013.01); *A23L 1/2003* (2013.01); *A23L 1/3055* (2013.01); *A23L 1/317* (2013.01); *A23L 1/31436* (2013.01); *A23L 2/52* (2013.01); *A23L 2/56* (2013.01); *A23L 2/66* (2013.01)

(58) Field of Classification Search
CPC ............................ A23L 1/2112; A23L 1/2006
See application file for complete search history.

(56) References Cited

U.S. PATENT DOCUMENTS

| | | | |
|---|---|---|---|
| 2,881,076 A * | 4/1959 | Sair | 426/634 |
| 4,137,339 A | 1/1979 | Kudo et al. | |

FOREIGN PATENT DOCUMENTS

| | | |
|---|---|---|
| JP | S33-007674 | 8/1958 |
| JP | 53-94047 A | 8/1978 |
| JP | 58-067157 A | 4/1983 |
| JP | 58-187146 | 11/1983 |
| JP | 09-094068 A | 4/1997 |
| JP | 2006-129877 A | 5/2006 |
| WO | WO 2006/129647 A1 | 12/2006 |

OTHER PUBLICATIONS

International Search Report in corresponding International Application No. PCT/JP2011/069909, mailed Nov. 15, 2011, pp. 1-2.

* cited by examiner

*Primary Examiner* — Elizabeth Gwartney
(74) *Attorney, Agent, or Firm* — Stephen J. Weyer, Esq.; Stiles & Harbison, PLLC.

(57) ABSTRACT

The present inventors found that the natural flavor intrinsic to soybean is retained more than ever before when soybean is processed to prepare a processed soybean material having a specific lipid content, a dietary fiber content, an acid-soluble component content and a protein content, whereby the present problems were solved. More specifically, the processed soybean material of the present invention is such that, on a solid weight basis, (1) a content of lipid, extracted with a mixed organic solvent wherein a ratio of chloroform to methanol is 2:1, is 10 to 40% by weight, (2) a dietary fiber content is 5 to 40% by weight, (3) a potassium content is 1% by weight or less, (4) a protein content is 30 to 65% by weight, and (5) a sum of γ-conglycinin and 24 kDa protein is 2.4 times or less of lipoxygenase protein in soybean proteins.

3 Claims, 1 Drawing Sheet

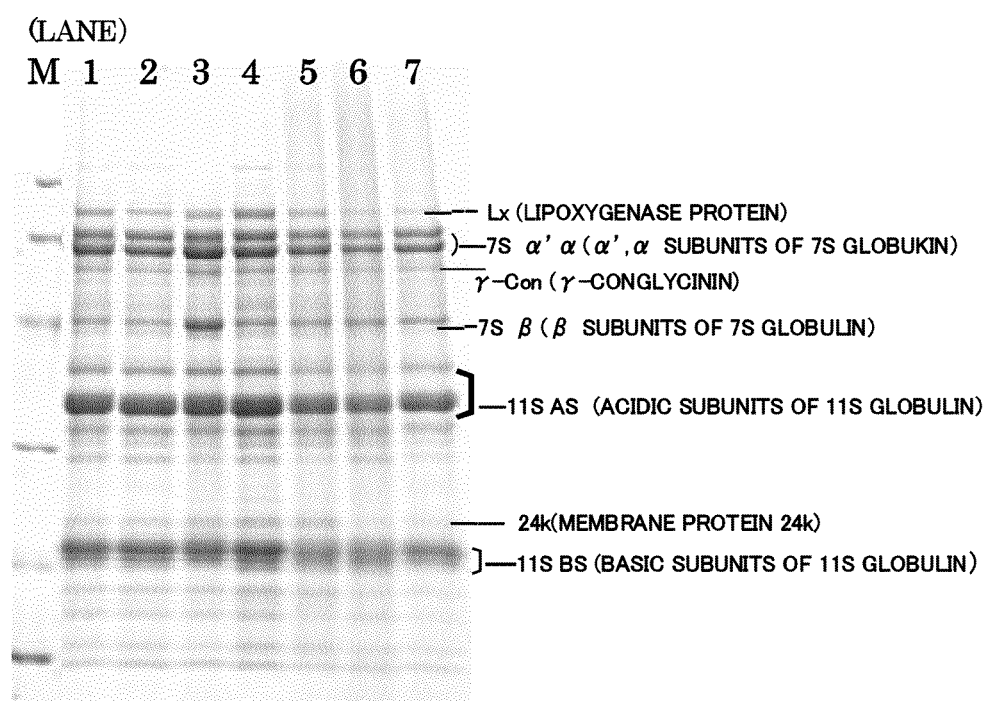

PROCESSED SOYBEAN MATERIAL AND METHOD FOR PRODUCING PROCESSED SOYBEAN MATERIAL

TECHNICAL FIELD

The present invention relates to a novel processed soybean material and a processed soybean material.

BACKGROUND ART

Soybean is outstanding food stuff among the beans which have nutritionally valuable oils and fats and proteins. In particular, the soybean proteins have an amino acid score of 100 representing the nutritional value equivalent to that of animal proteins, and soybeans are hence referred to as the meat of field.

Thus, in aiming to the advanced use of soybean, the nutritional value and physical functions of particularly soybean proteins have drawn attention, and soybean protein concentrates, wherein defatted soybean mainly used as a raw material is washed with acid or alcohol and the whey component is removed therefrom (Patent Literatures 1 and 2) and soybean protein isolates, wherein defatted soybean is water extracted to extract proteins followed by removing the fibers and the obtained extract is adjusted to acidity of pH 4 to 5 to precipitate the proteins from which the whey component is removed, have been produced.

In Japan, among the world, particularly processed soybean food products have been traditionally produced and consumed. Examples of the processed soybean food product include soy flour, kinako (roasted soybean flour), soymilk, okara (soybean residue), tofu, natto (fermented soybeans), soybean paste and soy sauce. Tofu is further processed to aburaage (deep-fried thin-sliced tofu), ganmodoki (fried tofu fritter) or koyadofu (freeze-dried tofu). Many of these processed soybean food products have the flavor distinctive of soybean. The reason why the processed soybean food products have been consumed by many people for a long time is probably because the distinctive soybean flavor matches the way people eat these products.

Incidentally, in the diet of people, grain consumption tends to decrease and meat consumption tends to increase. This tendency is thought to have been accelerating by the conversion to the wheat culture brought by the westernized diet, further increased number of processed food products and meat-oriented dishes. To expand the purpose of use of processed soybean food products based on the idea of correcting the imbalanced increased consumption of animal food products in such a diet and improving the nutritional balance is conceived to direct the people's health of today in a better direction.

However, in some cases the flavor of soybean may not be preferable depending on the purpose of use. Also, the sensations of sitting heavy on the stomach or bloating may be experienced depending on processing methods, particularly when soybean is formed or consumed like or combined with a dairy product, the flavors are incompatible, sometimes making it difficult to produce fabricated food products.

CITATION LIST

Patent Literature

Patent Literature 1: Japanese Examined Patent Publication No. 33-7674

Patent Literature 2: Japanese Patent Application Laid-Open No. 58-187146

SUMMARY OF INVENTION

Technical Problem

When proteins are highly purified from soybean as in the manufacturing processes of a soybean protein concentrate described in Patent Literatures 1 and 2, the natural soybean flavor is diminished and, conversely, a harsh taste giving an unpleasant aftertaste which is different from the natural flavor and unnatural flavor such as astringency are brought out, which is not preferable. The soybean materials which have been mainly used so far are soybean protein concentrates and soybean protein isolates, and the physical-functional agent utilizing the gel properties and emulsifying properties of soybean protein has been the primary purpose of use. For this reason, although the high protein content is regarded to be important for good quality and technological improvements have been proposed to some extent, innovative increase in palatability has not been attained. Consequently, the tendency of using soybean protein concentrates and soybean protein isolates as a nutritional-functional agent has increased, while currently the amount and range of use thereof are palatably limited.

In view of the above problems, the present invention has an object to provide a processed soybean material, which retains good flavor distinctive of soybean while being free of a harsh taste giving an unpleasant aftertaste or unnatural flavor such as astringency.

Solution to Problem

The present inventors carried out extensive studies to solve the above problems and found that the natural flavor intrinsic to soybean is retained more than ever before when soybean is processed to prepare a processed soybean material so as to have a specific lipid content, dietary fiber content, acid-soluble component content and protein content, whereby the above problems were solved.

More specifically, the present invention provides the inventions relating to;

(1) a processed soybean material wherein, on a solid weight basis, a content of lipid, extracted with a mixed organic solvent wherein a ratio of chloroform to methanol is 2:1, is 10 to 40% by weight; a dietary fiber content is 5 to 40% by weight; a potassium content is 1% by weight or less or a stachyose content is 2% by weight or less; a protein content is 30 to 65% by weight; and a sum of γ-conglycinin and 24 kDa protein is 2.4 times or less of lipoxygenase protein in soybean proteins;

(2) the processed soybean material according to (1) being in a powder form;

(3) the processed soybean material according to (1), wherein a NSI is 60 or more;

(4) the processed soybean material according to (3), wherein a jelly strength of a gel obtained by heating an aqueous solution having a solid content of 25% by weight of the processed soybean material at 80° C. for 30 minutes is 100 g·cm or more;

(5) a manufacturing process of a beverage or food product comprising adding the processed soybean material according to (1) during a step of producing a beverage or food product;

(6) a manufacturing process of a processed soybean material, comprising removing an acid-soluble component from fat-containing soybean, wherein a NSI is reduced to 80 or less, by extraction, and collecting insoluble residues;
(7) the manufacturing process of a processed soybean material according to (6), comprising, after collecting the insoluble residues, heat treating a dispersion prepared by adding water to the insoluble residues after collection; and
(8) the manufacturing process of a processed soybean material according to (7), comprising drying and powering the dispersion after the heat treatment.

Advantageous Effects of Invention

The present invention can provide a processed soybean material, which has reduced harsh taste giving an unpleasant aftertaste and astringency and retains the natural flavor of soybean which were not achievable by the conventional defatted soybean, soybean protein isolates or soybean protein concentrates.

Further, the processed soybean material of the present invention can be provided in the form of liquid or powder, contains lipid, fiber and protein in specific amounts and has a low content of the acid-soluble components, owing to which the material can be used fully utilizing the physical properties and nutritional physiological functions thereof.

BRIEF DESCRIPTION OF DRAWINGS

FIG. 1 is a chart showing the phoretic pattern on SDS-PAGE of each component in the soybean proteins in the processed soybean material.

DESCRIPTION OF EMBODIMENTS

The processed soybean material of the present invention has a composition in which, on a solid weight basis, (1) a content of lipid, extracted with a mixed organic solvent wherein a ratio of chloroform to methanol is 2:1, is 10 to 40% by weight, (2) a dietary fiber content is 5 to 40% by weight, (3) a potassium content is 1% by weight or less or a stachyose content is 2% by weight or less, (4) a protein content is 30 to 65% by weight, and (5) a sum of γ-conglycinin and 24 kDa protein is 2.4 times or less of lipoxygenase protein in soybean proteins. Hereinbelow, the embodiments of the present invention are specifically described.
1. Composition
The processed soybean material of the present invention has an unconventional novel compositional feature by the combination of the following (1) to (5) requirements.
(1) Lipid Content
The processed soybean material of the present invention comprises, on a solid weight basis, a lipid content of 10 to 40% by weight, preferably 15 to 40% by weight, more preferably 25 to 35% by weight, further preferably 29 to 35% by weight. The ranges may be suitably adjusted depending on the variety of soybean or partially defatting of soybean in advance. When the flavor needs to be richer, a lipid content may be adjusted to be higher, and when the physical properties of the material such as gelling properties need to be enhanced, a lipid content may be adjusted to be lower. The lipid content used in the present invention is a value calculated to determine a lipid content, using an amount of an extract, as a lipid amount, extracted for 30 minutes at atmospheric boiling point using a mixed solvent wherein chloroform:methanol is 2:1. FOSS's "Soxtec" can be used as a solvent extraction device. More specifically, the lipid content in the present invention is defined to be a content as an extract extracted with a chloroform/methanol mixed solvent (the same applies hereinafter in the specification). The above measurement method shall be referred to as the "chloroform/methanol mixed solvent extraction method." According to this extraction method, polar lipids such as lecithin are also extracted in addition to the neutral lipids. In the above measurement method, the general soy flour has a lipid content of about 25% by weight and okara (soybean residue) has a lipid content of about 20% by weight, however, the present processed soybean material is clearly distinguished from defatted soybean, soybean protein isolates and soybean protein concentrates whose lipid contents are below 10% by weight.
(2) Dietary Fiber Content
The processed soybean material of the present invention comprises, on a solid weight basis, a dietary fiber content of 5 to 40% by weight, preferably 10 to 30% by weight, more preferably 11 to 20% by weight, further preferably 12 to 16% by weight. The content of dietary fiber used in the present invention is in conformity with "STANDARD TABLES OF FOOD COMPOSITION IN JAPAN, Fifth Revised and Enlarged Edition" (the Ministry of Education, Culture, Sports, Science & Technology, 2005) and the dietary fiber content is measured by an enzymatic-gravimetric method (Prosky method). The soy flour and soybean protein concentrates typically have a dietary fiber content of about 20% by weight, however, the present processed soybean material is clearly distinguished from okara (soybean residue) whose dietary fiber content is about 45 to 50% by weight.
(3) Acid-soluble Component
The acid-soluble components in the processed soybean material of the present invention is decreased or removed. For the indicator of acid-soluble components, contents of minerals or oligosaccharides, which are acid-soluble non-protein components, can be used, and a content of potassium among the minerals or stachyose among the oligosaccharides in particular can be used as the indicator. The case wherein potassium or stachyose is used as the indicator is described below, but the processed soybean material of the present invention does not need to satisfy the requirement for both indicators but needs to satisfy the requirement for either one of the indicators.
A. Potassium
When a potassium content is used as the indicator of acid-soluble components in the processed soybean material of the present invention, the content is, on a solid weight basis, 1% by weight or less, preferably 0.7% by weight or less, further preferably 0.5% by weight or less. The content of potassium used in the present invention is measured using an atomic absorption method by preparing a sample by a dilute acid extraction method or a dry ash method in conformity with "STANDARD TABLES OF FOOD COMPOSITION IN JAPAN, Fifth Revised and Enlarged Edition" (the Ministry of Education, Culture, Sports, Science & Technology, 2005), but can also be measured by a method employed by a public analysis laboratory. The potassium content of a soybean protein isolate is typically about 0.2% by weight but that of the soy flour is about 2% by weight and those of okara (soybean residue) and a soybean protein concentrate are typically about 1.4%, hence the present processed soybean material is clearly distinguished from soybean protein isolates, okara (soybean residue) and soybean protein concentrates.
B. Stachyose
When a stachyose content is used as the indicator of acid-soluble components in the processed soybean material of the present invention, the content is, on a solid weight basis, 2% by weight or less, preferably 1% by weight or less, more preferably 0.7% by weight or less, further preferably 0.5% by weight or less. The content of stachyose used in the present invention is measured by, in conformity with Japanese Healthy Nutrition Food Association, "Testing Manual for Food for Specified Health Uses (Final Edition)" (Tokutei hoken-yo shokuhin shiken kensa manual (saishuban) (in Japanese)), 154-166 (1999), HPLC using a stachyose reference standard and a differential refractometer as a detector, but can also be measured by a method employed by a public analysis laboratory. Incidentally, the stachyose content of soy flour is about 4% by weight, which is clearly distinguished from that of the present processed soybean material.

(4) Protein Content

The processed soybean material of the present invention is, on a solid weight basis, 30 to 65% by weight, preferably 35 to 60% by weight, more preferably 45 to 55% by weight, further preferably 45 to 50% by weight. The content of protein used in the present invention is calculated by multiplying a nitrogen amount determined by the Kjeldahl method by a nitrogen-to-protein conversion factor 6.25. The general soy flour typically has a protein content of about 40 to 45% by weight but that of okara (soybean residue) is about 27% by weight, that of a soybean protein concentrate is about 70% by weight, that of a soybean protein isolate is about 90% by weight, hence the present processed soybean material is clearly distinguished from okara (protein residue), a soybean protein concentrate and a soybean protein isolate.

(5) Composition of Soybean Proteins

The processed soybean material of the present invention has the characteristic protein compositions wherein, among the soybean proteins contained, the sum of γ-conglycinin and 24 kDa protein is 2.4 times or less, preferably 2.2 times or less, preferably 2 times or less, further preferably 1.7 times or less, of lipoxygenase protein (Lx). More specifically, the value of "X=(γ+24%)/Lx", the indicator of abundance proportion of lipoxygenase protein, is within the above numerical value ranges and the smaller such a numerical value is, the higher the proportion of lipoxygenase protein is, whereby the processed soybean material of the present invention is characterized. In the case of typical soybean protein materials such as soybean protein isolates, soybean protein concentrates or soymilk, the X value is 2.5 times or more, and the proportion of lipoxygenase protein is smaller than that of the present processed soybean material. The lower limit of X value is not set but is 1 time or more, or 1.3 times or more.

Lipoxygenase protein is an enzyme protein contained in soybean and acts on the process of hexanal production by the oxidation of linoleic acid. "24 kDa protein" is one of the membrane proteins of soybean and a type of lipid-binding protein accompanied by a polar lipid such as lecithin or glycolipid. γ-Conglycinin is a glycoprotein contained in soybean. The presence of 3 types, α, β and γ, of conglycinin in the soybean proteins is known based on the immunological characteristics differences, and γ-conglycinin is one of these types and has a mass of 54 kDa.

The composition of these soybean proteins is thought to be different also depending on the variety, but can be analyzed using SDS polyacrylamide gel electrophoresis (SDS-PAGE). The protein composition can be determined by a method wherein the SDS gel is stained using a Coomassie Brilliant Blue (CBB) dye after the electrophoresis, followed by calculating using a densitometer (reflection density meter) a percentage of the color depth on a part of the band corresponding to each protein against the color depth of the band representing all proteins shown in the peak area. Specifically, the method complies with the following calculation method.

<Calculation Method of Protein Composition Indicator of Lx ([γ+24 k]/Lx)>

(a) FIG. 1 shows the electrophoresis patterns of each stained soybean protein developed by SDS-PAGE. As the major proteins in each protein, 7S globulin (β-conglycinin) is composed of an α subunit, an at subunit and a β subunit and 11 S globulin (glycinin) is composed of an acidic subunit (AS) and a basic subunit (BS), and these proteins are confirmed to be the primary proteins. Further, an intended indicator can be determined by calculating a staining ratio of the staining degree of, among the minor proteins, membrane protein 24 kDa protein, low soluble γ-conglycinin and lipoxygenase protein (Lx), namely, X=(γ-conglycinin+24 kDa protein)/lipoxygenase protein. SDS-PAGE is carried out in accordance with the conditions shown in Table 1.

TABLE 1

| Applied amount: | 20 μl of a sample solution containing 0.1% protein in each well |
|---|---|
| Well width: | 5 mm |
| Well volume: | 30 μl |
| Stain solution: | 1 g of Coomassie Brilliant Blue (CBB), 500 ml of methanol, 70 ml of glacial acetic acid (CBB is thoroughly dissolved in methanol and acetic acid and water are added thereto to give 1 L.) |
| Staining time: | 15 hours |
| Stain removing time: | 6 hours |
| Densitometer: | GS-710 Calibrated Imaging Densitometer/ Quantity One Software Ver. 4.2.3 (Bio Rad Japan Co. Ltd) Scan width: 5.3 mm, Sensitivity: 30 |

(Other Components)

The processed soybean material of the present invention does not require specifying other components to demonstrate the characteristics thereof. For example, sugar is as low as 10% by weight or less on a solid weight basis. The ash content is also as low as 6% by weight or less on a solid weight basis.

The processed soybean material of the present invention is specified, as described above, by the combination of the lipid content, dietary fiber content, acid-soluble component content, protein content and soybean protein composition, and provides the natural flavor of soybean without the distinctive odor and astringent taste which were not achievable by the existing materials such as the conventional defatted soybean, soybean protein isolates and soybean protein concentrates by having such a specific composition. In other words, when the acid-soluble components (minerals, oligosaccharides, acid-soluble proteins) are reduced or removed, it is important to keep in the processed soybean material lipoxygenase protein, which is usually contained in the acid-soluble components and has been usually avoided as a causative component of the bad flavor.

The processed soybean material of the present invention has the above composition, but, for example, in the manufacturing process of the present material, lipids, dietary fibers, acid-soluble components or proteins can be added separately, and in that instance the material may consequently have the composition outside the above composition range, however, such a material is encompassed as an equivalent product to the present material.

2. Form

The form of the processed soybean material of the present invention may be any form regardless of whether powder or liquid. Powder form is preferable in the light of particularly easy and simple handling.

3. Manufacturing Embodiment

The processed soybean material of the present invention uses soybean as the raw material and is obtained by processing it, and one of the manufacturing methods comprises removing acid-soluble components from fat-containing soybean, wherein a NSI (Nitrogen Solubility Index) is reduced to 80 or less, by extraction and collecting insoluble residues. The manufacturing process itself is characterized by the steps thereof, and the composition of the processed soybean material to be obtained is not limited to the above composition. For example, owing to the component composition differences in the variety of soybeans to be used as raw materials, some cases where the composition of material is not consistent with the above composition are also encompassed. Such an embodiment is specifically described below.

(1) Raw Material Soybean

The raw material soybean to be used in the soybean material of the present invention can be soybeans of varieties commonly available but the use of fat-containing soybean is preferable. The fat-containing soybean means the soybean which contains lipids. The lipid content of the fat-containing soybean may be those meeting the range of lipid content of the present processed soybean material to be manufactured using the fat-containing soybean as the raw material, but those containing at least 10% by weight of a lipid are preferable and specific examples of such include full fat soybean and reduced fat soybean from which the oil component is partially extracted by press extraction or subcritical gas extraction. On the other hand, when defatted soybean having a lipid content of 3% by weight or less is used, it is difficult to manufacture a processed soybean material having the lipid content as specified in the present invention. Incidentally, the lipid content used herein also refers to the numerical value when measured using a chloroform/methanol mixed solvent extraction method.

The form of raw material soybean is not limited and it is preferable that the form be those in which soybean is easily extracted with an aqueous solvent, namely that the form have the tissues being broken down so as to have the large surface area. Examples include cracking, grinding, crushing, shearing and pressing. In particular, it is preferable that the raw material soybean be ground to suitable grain sizes, and powders having a maximum particle diameter of 500 μm or less, more preferably 300 μm or less, further preferably 100 μm or less, when the particle size distribution is measured by the laser diffraction and scattering method, are suitable. The rough texture can be decreased by processing the raw material soybean to even finer powder.

It is desirable that the raw material soybean contain suitably denatured soybean proteins, and the NSI representing a protein extraction rate is preferably 80 or less, more preferably 75 or less, further preferably 70 or less. The lower limit of NSI is not limited but preferably 5 or more, more preferably 20 or more, since when the NSI is too low, the protein is denatured causing deteriorated physical properties and deteriorated color and flavor at the same time, hence a too low NSI is not preferable. It is preferable that the water content of the soybean be 2 to 15% by weight, and it is more preferable to be 5 to 12% by weight.

The NSI measurement method complies with the following method.

2 g of the raw material is collected and dispersed in 100 ml of water, extracted at 600 rpm using a stirrer for 60 minutes and centrifuged at 3000 g for 10 minutes, the supernatant is collected, 100 ml of water is added again to the precipitate, followed by collecting the supernatant in the same manner, the two supernatants are combined and filtered using a filter paper (No. 5A), and the filtrate is filled up to 250 ml. The nitrogen amount in the filtrate is measured by the Kjeldahl method, the measured nitrogen amount is multiplied by the nitrogen conversion factor (6.25) of the soybean protein, whereby an amount of extracted protein is calculated. The percentage of the extracted protein amount with respect to the protein amount in the raw material similarly measured by the Kjeldahl method is determined, which is to be a NSI.

(2) Extraction Removal of Acid-Soluble Components

Next, acid-soluble components are removed from the above raw material soybean by extraction. The acid-soluble component in the present invention typically includes saccharides and proteins such as trypsin inhibitor, lipoxygenase and lectin. On the other hand, the acid insoluble component includes dietary fiber, lipids, proteins such as β-conglycinin, glycinin, γ-conglycinin and 24 kDa protein.

The extraction solvent to be used is an aqueous solvent, and hydrophilic organic solvents such as alcohols or acetone may be included but it is more preferable to use pure water.

The pH of an aqueous solvent is adjusted to acidic by adding acid such as hydrochloric acid and it is particularly preferable that the pH be adjusted to pH 3 to 6, preferably pH 4 to 5, which is close to the isoelectric point of soybean proteins.

The amount of an aqueous solvent added is, with respect to the raw material soybean, preferably 4 to 20 times by weight, more preferably 7 to 12 times by weight. When an amount of adding an aqueous solvent is too small, the viscosity becomes too high, whereas when an amount is too large, a dilute solution is generated to deteriorate the recovering efficiency.

It is preferable that the temperature at the time of extraction be about 4 to 60° C., and it is more preferable to be about 10 to 50° C. When a temperature is too high, most of the proteins become susceptible to denaturing, whereas when a temperature is too low, the extraction efficiency of the acid-soluble components is affected.

The extraction operation may be the batch method or sequential extraction procedure, and stirring may be carried out as necessary. The extraction time is not particularly limited, but it is preferable to be about 5 to 100.

(3) Collection of Insoluble Residues

After the extraction of acid-soluble components, the insoluble residues are collected by the centrifugal separation or filtration at pH 3 to 6, preferably pH 4 to 5, which is close to the isoelectric point.

The obtained collected product can be a product at such a pH, and, if necessary, the pH can be further adjusted to close to neutral (e.g., pH 6.5 to 7.5) by adding water (preferably 4 to 6 times by weight) and alkali such as sodium hydroxide.

Furthermore, among the insoluble residues, okara (soybean residue), which is fiber, may be partially removed using a centrifugal separator or by filtration.

(4) Additional Steps

The above insoluble residues may be remained in the form of liquid, may be dried by spray drying to be processed to the form of powder, or may further be processed to the form of granule by granulation to obtain the final product. Additionally, heat treatment may be carried out before the above step of productization to facilitate the solubility of proteins and enhance the dispersibility into water, along with the sterilization of microorganisms. When the solubility is improved by heat treatment, it is preferable that the NSI be as highly soluble as preferably 60 or more, preferably 70 or more, more preferably 75 or more. Such a heating condition is preferably a temperature of 100 to 190° C. for about 0.5 seconds to 3 minutes, and heat treatment at a higher temperature for shorter time of at 110 to 190° C. for 0.5 to 2 minutes is more preferable. For the heating apparatus, the direct heating system using pressurized steam is particularly preferable in the light of enhancing the NSI. When such a high solubility is achieved, gel formability is also imparted and, in this instance, it is preferable that a gel strength of the gel, which is obtained by heating an aqueous solution having a solid content of 25% by weight at 80° C. for 30 minutes, be 100 g·cm or more.

Also, in any of the above steps (1) to (4), the flavor can be suitably adjusted by the addition of a bivalent metal ion such as calcium or magnesium. Further, physical properties of the material can be suitably improved by allowing an enzyme such as protease, cellulase, hemicellulase, transglutaminase, protein glutaminase or phytase to act thereon.

The processed soybean material obtained by the above manufacturing embodiments is different from the typical soy flour, soy milk, okara (soybean residue), soybean protein concentrates and soybean protein isolates and has the characteristic composition described in the above 1.

After the processed soybean material having the characteristic composition of the above 1 is obtained, separately, oils and fats, saccharides, proteins, fiber or minerals may suitably be added for the purpose of adjusting the flavor or physical properties. Alternatively, these components may suitably be added in the manufacturing step of the present processed soybean material. In these instances, some cases may arise wherein the present processed soybean material does not meet the composition of the above 1, but such an embodiment is within the scope equivalent to the present invention.

4. Physical Property•Flavor

While physical properties such as gelling properties and water holding capacity are good in many conventional soybean protein materials, it was difficult and insufficient to solve the problems of flavors such as soybean smell, however, the processed soybean material of the present invention has a plain flavor (light taste, light smell) unlike conventional products, can be used even as a substitute for milk and is highly versatile as a food material. As for physical properties, the present material has good water holding capacity, properties of retaining a form and emulsifying, and the high solubility type is also imparted with gel formability.

5. Use in Beverages or Food Products

The processed soybean material of the present invention can be used in a wide range as, for example, the body material in solid or semi-solid food products and as the nutritional component of soybean in liquid beverages or food products. Specifically, when the present material is used as a substitute for a dairy ingredient, a good milk substitute food product free of uncomfortable flavor and physical properties can be prepared. Examples of the dairy food products to be replaced include bovine milks, creams, ice creams, cheeses, yogurts, spreads and flour pastes. In these products, the processed soybean material of the present invention is used as a partial or entire substitute for milk.

Also, other than dairy products, the present material can be used as a meat substitute in the form of textured material obtained by using a method for forming a tofu-like gelated texture, and such a material can be used as a tofu-like processed material having a plane flavor in combination with a coagulant. Further, in addition to soybean, textured materials obtained by mixing with other food product materials or food additives can also be used.

Other than the above purposes of use, the present material can be used as the raw material for a wide variety of food products in which conventional soybean protein isolates and soybean protein concentrates have been used, and can be used in, for example, breads; baked sweets such as cookies and nutrition bars; sweets such as cakes and Japanese sweets; fish paste products or animal meat paste products.

6. Nutritional Physiological Function (1) Low GI Function

The processed soybean material of the present invention has minerals such as potassium efficiently removed and, at the same time, low-molecule saccharides (sucrose, stachyose and raffinose) contained in soybean are also removed, due to which the material can also be used in low GI (Glycemic Index) fabricated food products.

(2) High Dietary Fiber

The processed soybean material of the present invention is abundant in dietary fiber and thus can be used as a source of dietary fiber, which tends to be insufficient in people today.

(3) Hypoallergenic Function

The processed soybean material of the present invention has reduced acid-soluble soybean allergenic proteins and thus the risk of soybean allergy can be reduced when the present material is used in soybean-utilizing food products such as a soy beverage.

(4) Lipid Metabolism Improving Function

The processed soybean material of the present invention has lipid metabolism improving activities such as triglyceride lowering activity and cholesterol lowering activity. For triglyceride in particular, the present material has even higher lowering effects than β-conglycinin whose lowering effects has been always considered high and is hence useful as a composition for lowering triglyceride.

EXAMPLES

Hereinafter, Examples are described to explain the embodiments of the present invention more specifically. The "%" indicates % by weight and the "part" indicates part by weight, unless otherwise specified.

Example 1

Preparation 1 of the Present Processed Soybean Material

Using as a raw material full fat soybean (a lipid content is 25% on a solid weight basis) wherein the NSI was lowered to 60 by heat treatment, the soybean was skinned and ground using a pin mill so that the maximum particle diameter is 100 μm or less when measured by the laser diffraction and scattering method, water in an amount of 15 times by weight with respect to the obtained ground soybean was added and the pH was adjusted to an acidic condition of 4.5 using hydrochloric acid. The resultant was extracted at 35° C. for 20 minutes with stirring and then the supernatant containing the acid-soluble components was separated and removed using a centrifugal separator. The separated and collected insoluble residue was neutralized to pH 7 with sodium hydroxide, heat sterilized at 120° C. for 1 minute and dried and powdered by spray drying, thereby obtaining the processed soybean material in powder form. The obtained processed soybean material was determined for NSI, the contents of lipids, dietary fiber, potassium and proteins on a solid weight basis and further the ratio of the sum of γ-conglycinin and 24 kDa protein with respect to lipoxygenase protein (X=[γ-conglycinin+24 kDa protein]/lipoxygenase protein).

Example 2

Preparation 2 of the Present Processed Soybean Material

A processed soybean material in powder form was obtained in the same manner as in Example 1, with the exception that full fat soybean wherein the NSI was lowered to 69 by heat treatment was used as the raw material. Then the components were analyzed in the same manner as in Example 1.

Comparative Example 1

Comparative Processed Soybean Material 1

A processed soybean material in powder form was obtained in the same manner as in Example 1, with the exception that unheated full fat soybean (NSI 90) was used. Then the components were analyzed in the same manner as in Example 1.

Comparative Example 2

Comparative Processed Soybean Material 2

The processed soybean material in powder form was obtained, using as the raw material full fat soybean wherein the NSI was lowered to 69 by heat treatment, by skinning and grinding the soybean, adding water in an amount of 15 times by weight with respect to the soybean, stirring the resultant at 35° C. for 20 minutes and directly heat sterilizing without removing the soluble components and dry powdering by spray drying. Then the components were analyzed in the same manner as in Example 1.

Comparative Example 3

Soy Milk Powder

The processed soybean material in powder form (soy milk powder) was obtained, using as the raw material full fat soybean wherein the NSI was lowered to 69 by heat treatment, by skinning and grinding the soybean, adding water in an amount of 15 times by weight with respect to the soybean, stirring at 35° C. for 20 minutes, filtering the insoluble residue using a filter cloth to obtain soy milk, heat sterilizing and dry powdering the soy milk by spray drying. Then the components were analyzed in the same manner as in Example 1.

Comparative Examples 4 and 5

Commercial products, a soybean protein concentrate "Arcon S" (a product of Archer Daniels Midland Company) and a soybean protein isolate "Fujipro E" (a product of FUJI OIL CO., LTD.) were obtained, and each component was analyzed in the same manner as in Example 1.

Table 2 shows the component analysis results of each processed soybean material obtained in Examples 1, 2 and Comparative Examples 1 to 5. All of the processed soybean material obtained in Examples 1 and 2 were imparted with high solubility with a NSI being 80 or more by the final heat sterilization. The X values of Examples 1 and 2 were smaller than those of Comparative Examples and the processed soybean materials contained a comparatively large amount of lipoxygenase protein. Also, the potassium contents and the stachyose contents of Examples 1 and 2 are less than those of Comparative Examples 2 and 3, revealing that the residual amounts are quite low.

TABLE 2

Analysis values of each processed soybean material

| | NSI (after processed) | Lipid (%) | Dietary fiber (%) | Potassium (%) | Stachyose (%) | Protein (%) | X value (time) |
|---|---|---|---|---|---|---|---|
| Example 1 | 81 | 30.7 | 14.2 | 0.38 | 0.42 | 48.9 | 1.4 |
| Example 2 | 84 | 29.3 | 13.6 | 0.62 | 0.47 | 48.0 | 2.0 |
| Comparative Example 1 | 85 | 27.5 | 14.8 | 0.45 | 0.50 | 51.3 | 2.8 |
| Comparative Example 2 | 83 | 25.2 | 9.5 | 2.34 | 4.0 | 41.0 | 1.2 |
| Comparative Example 3 | 85 | 20.4 | 1.5 | 2.56 | 4.8 | 38.2 | 2.9 |
| Comparative Example 4 | 80 | 3.2 | 21.3 | 0.25 | 0.33 | 70.2 | 2.5 |
| Comparative Example 5 | 90 | 4.5 | 0.8 | 0.20 | 0.30 | 96.3 | 2.5 |

For reference purposes, FIG. 1 shows the phoretic patterns on SDS-PAGE when the X value of each processed soybean material obtained in Examples 1, 2 and Comparative Examples 1 to 3 was determined. Lane 1 represents Example 1, Lane 2 represents Example 2, Lane 3 represents Comparative Example 1, Lane 4 represents Comparative Example 2, Lane 5 represents Comparative Example 3, Lane 6 represents Comparative Example 4 and Lane 7 represents Comparative Example 5. Further, Lane M is the molecular weight marker and represents, from the top, each band of 97 kDa, 66 kDa, 50 kDa, 30 kDa, 21 kDa and 14 kDa.

Test Example 1

The flavor evaluation was carried out for each of the processed soybean materials. A 10% solution of each material was prepared and 10 panelists were asked to sample and evaluate the flavor. Whether the bad flavor of soybean was sensed or not was evaluated on a scale of 10 points in which the stronger they sensed the higher the score was, and the total points by the 10 panelists were shown in Table 3. The lower the score is, the flavor is plane and favorable.

TABLE 3

| | Pungency | Astringency | Bloating sensation |
|---|---|---|---|
| Example 1 | 9 | 5 | 8 |
| Example 2 | 30 | 24 | 28 |
| Comparative Example 1 | 75 | 82 | 57 |
| Comparative Example 2 | 55 | 62 | 75 |
| Comparative Example 3 | 48 | 71 | 68 |
| Comparative Example 4 | 76 | 65 | 43 |
| Comparative Example 5 | 62 | 75 | 38 |

All of those prepared in Examples had reduced harsh taste giving an unpleasant aftertaste and astringency together with reduced bloating sensation compared with those prepared in Comparative Examples and had the characteristic flavor none of the conventional processed soybean materials had ever achieved before. In particular, the flavor of processed soybean material of Example 1 was outstanding.

Example 3

Application Example

1. Application to Ice Cream

100 Parts of a 12% solution of the present processed soybean material (Example 1) was prepared, 0.1 parts of salt and 50 parts of sugar were added thereto, the solution was cooled in an ice creamer to make a body and 100 parts of pure vegetable whip cream was added thereto to prepare a pure vegetable ice cream. The obtained product had a plane flavor completely free of the harsh taste giving an unpleasant aftertaste and astringency unlike the case wherein a conventional soybean protein material was used. Also, the case wherein the present processed soybean material obtained in Example 2 was used instead had the same tendency. Further, another ice cream was separately prepared in combination with fresh cream to impart milk flavor, but unexpectedly the pure vegetable ice cream with no milk flavor was palatably favorable.

2. Application to Beverages

A 10% solution of the present processed soybean material (Example 1) was prepared, 0.1% of salt was added thereto and an equivalent amount of bovine milk was mixed therewith to prepare soybean milk. The obtained soybean milk was semi-vegetable, nutritionally well balanced with moderate milk flavor, free of pungency and astringency as found in soy milk and heaviness caused by aftertaste, and was hence a beverage that was very easy to drink.

3. Application to Body Material

50 Parts of starch, 100 parts of the present processed soybean material (Example 1), 100 parts of oils and fats, 0.8 parts of salt and 300 parts of water were mixed to prepare a paste, which was heated at 90° C. for 30 minutes and then cooled, thereby obtaining a solid product having a cheese-like texture. The body material had a plane flavor and was able to be completed as a vegetable cheese-like food product with a flavor of choice when combined with other tasting agents.

4. Application to Whipped Cream

60 Parts of water, 30 parts of oils and fats, 1 part of an emulsifier and 0.1 parts of bittern were added to 2 parts of the present processed soybean material (Example 1) and 5 parts of sugar and an emulsion was prepared using a high pressure homogenizer and stirred vigorously to obtain a pure vegetable whipped cream.

5. Application to Animal Meat/Fish Paste Products

10 Parts of the present processed soybean material (Example 1) and 30 parts of water were added to 100 parts of a fish paste, the mixture was kneaded, formed and fried at 130° C. for 10 minutes, thereby obtaining a fish paste product. A deep-fried product having a tofu-like light soybean flavor and fish flavor was produced.

Test Example 2

Using the present processed soybean material prepared in accordance with Example 1 as a sample, the effect of consuming such a material on the lipid metabolism improvement in the body was studied.

In accordance with AIN-93G composition (REEVES P. G. et al.: J. NUTR., 123, 1939-1951, 1993.), using as a control food containing 20% of casein "Vitamin free casein" (a product of ORIENTAL YEAST CO., LTD.) as the coarse protein amount, a test food wherein the protein source was substituted with the present processed soybean material (Table 4) was fed to animals by the following method. The amount of soybean oil for the casein group was adjusted and mixed so that the amount was equal to the lipid content of the present processed soybean material group. Each diet was adjusted so that the coarse protein amount was 20%.

The model animals used were 20 5-week old Wistar male rats (sold by CLEA Japan, Inc.). After preliminary rearing for 1 week, the rats were divided to give 10 rats for each group so that the average body weights between the groups were substantially equal, and breeding on the test food for 2 weeks was carried out.

TABLE 4

| Component | Casein group (control) | Present processed soybean material group |
|---|---|---|
| Casein | 22.7 | |
| Soybean processed material (Example 1) | | 42.3 |
| Soybean oil (*) | 12.5 | |
| β-Cornstarch | 31.8 | 24.7 |
| Sucrose | 10.0 | 10.0 |
| α-Cornstarch | 13.2 | 13.2 |
| Cellulose powder | 5.0 | 5.0 |
| Min. mix (AIN-93G) | 3.5 | 3.5 |
| Vit. mix (AIN-93) | 1.0 | 1.0 |
| Choline hydrogen tarrrate | 0.25 | 0.25 |
| Total | 100 | 100 |

(*) 0.002% of TBHQ is contained.

When the lipid weight per body weight (/100 g body weight) was compared 2 weeks later, each lipid tissue weight in the group of present processed soybean material was significantly reduced in comparison with that of the casein group (Table 5).

TABLE 5

| | | Casein group (control) | Present processed soybean material group |
|---|---|---|---|
| n Number | | 10 | 10 |
| Body weight gain | (g) | 94 ± 1.6 | 85 ± 3.1 |
| Total consumption | (g) | 287 ± 4.2 | 268 ± 6.0 |
| Liver | (g) | 12.1 ± 0.25 | 9.64 ± 0.18 * |
| | (g/100 g body weight) | 4.49 ± 0.07 | 3.78 ± 0.08 * |
| Perirenal/retro-peritoneal fat | (g) | 4.26 ± 0.26 | 2.51 ± 0.22 * |
| | (g/100 g body weight) | 1.58 ± 0.09 | 0.98 ± 0.08 * |
| Epididymal fat | (g) | 3.51 ± 0.14 | 2.45 ± 0.10 * |
| | (g/100 g body weight) | 1.31 ± 0.05 | 0.96 ± 0.03 * |
| Mesenteric fat | (g) | 2.63 ± 0.13 | 1.72 ± 0.08 * |
| | (g/100 g body weight) | 0.98 ± 0.05 | 0.67 ± 0.02 * |

* Measured value is mean value ± standard deviation, T-test (*: to casein $p < 0.05$)

After the completion of test, the rats were fasted for 6 hours since 8:00 am and subjected to laparotomy under anesthetization with Nembutal to collect blood from the aorta abdominalis. After treating with heparin, the blood was centrifuged at 3000 rpm for 15 minutes and the obtained plasma was immediately frozen to use as a blood sample.

The blood components were analyzed for triglyceride (TG) and total cholesterol (TC) using Dri-Chem 7300 (a product of Fujifilm Corporation). Each measured value was shown in the mean value±standard error (SEM).

The levels of triglyceride and total cholesterol in blood were both significantly lower in the group of the present processed soybean material in comparison with the casein group (Table 6). Further, the reduction effect on triglyceride in blood was evidently stronger in comparison with the experiments wherein the existing soybean protein materials such as conventional soybean protein isolates and β-conglycinin protein were evaluated by the similar test system.

Based on the above, it was thought that the present processed soybean material demonstrated the lipid metabolism improving effect on casein and such an effect was stronger than that rendered by the conventional soybean protein materials.

TABLE 6

|  | Triglyceride (mg/dl) | Total cholesterol (mg/dl) |
|---|---|---|
| Casein | 125 ± 16 | 81 ± 3 |
| Present invention product (Example 1) | 39 ± 3 * | 67 ± 2 * |

* Measured value is mean value ± standard deviation, T-test (*: to casein p < 0.05)

INDUSTRIAL APPLICABILITY

By the use of the present processed soybean material, characteristic soybean utilizing food products, which are substitutable for the purpose of use of the conventional soybean protein materials whose use were only in limited ranges, can be provided. Such a soybean food utilizing product can be expected to extend the soybean food culture to the dairy product-like food product field and expand fields wherein soybean and soybean proteins are used in the food industry.

The invention claimed is:

1. A manufacturing process of a processed soybean material having an NSI of 60 or more, comprising:
    (a) extracting an acid-soluble component from a full fat soybean material, wherein an NSI of the full fat soybean material, prior to extracting, having been previously reduced to 80 or less,
    (b) removing the acid-soluble component obtained by the extraction step, collecting insoluble residues, and
    (c) increasing the NSI of the insoluble residues to 60 or more by heat treatment to produce the processed soybean material,
    wherein the processed soybean material, on a solid weight basis comprises:
        (1) a content of lipid, extracted with a mixed organic solvent having a ratio of chloroform to methanol of 2:1, from 15 to 40% by weight;
        (2) a dietary fiber content from 10 to 40% by weight;
        (3) a potassium content from 1% by weight or less or a stachyose content is 2% by weight or less;
        (4) a protein content from 45 to 55% by weight; and
        (5) a sum of γ-conglycinin and 24 kDa protein from 2.4 times or less of lipoxygenase protein in soybean proteins.

2. The manufacturing process of a processed soybean material according to claim 1, wherein the NSI is reduced to 75 or less.

3. The manufacturing process of a processed soybean material according to claim 1, wherein the NSI is reduced to 70 or less.

* * * * *